D. DONALDSON.
DEVICE FOR ELECTRICALLY HEATING HAND IRONS.
APPLICATION FILED SEPT. 16, 1920.

1,401,592.

Patented Dec. 27, 1921.

INVENTOR:
David Donaldson
BY Wm Wallace White
ATTY.

UNITED STATES PATENT OFFICE.

DAVID DONALDSON, OF LEITH, SCOTLAND.

DEVICE FOR ELECTRICALLY HEATING HAND-IRONS.

1,401,592.  Specification of Letters Patent.  Patented Dec. 27, 1921.

Application filed September 16, 1920. Serial No. 410,758.

*To all whom it may concern:*

Be it known that I, DAVID DONALDSON, a subject of the King of Great Britain and Ireland, residing at Leith, Scotland, have invented new and useful Improvements in and Relating to Devices for Electrically Heating Hand-Irons, of which the following is a specification.

My invention relates to apparatus for heating electric irons of the type in which cords or flexible conductors are dispensed with, and in which the iron is placed in direct electrical contact with contacts on a switch or controlling board, and has for its object in a simple manner to improve the construction and action of such apparatus.

In carrying out my invention the appliance for heating electric irons, consists of a board provided with a switch and preferably four terminals. In connection with the board there is provided a stand, adapted to receive one or more electrical irons. Porcelain, or other insulating stops, are provided to prevent the irons when in position on the stand, from impinging or bearing against the board.

The board is provided with a pilot lamp.

In order that my said invention and the manner of performing the same may be properly understood I hereunto append a sheet of explanatory drawings to be hereinafter referred to in describing my invention.

Figure 1:
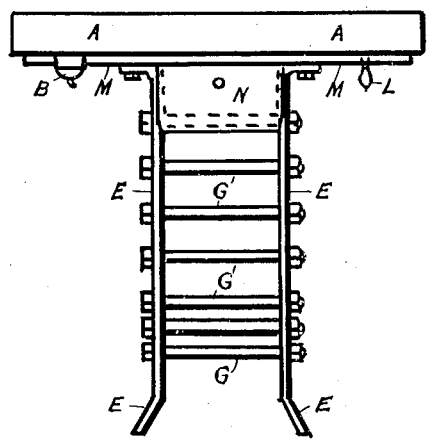
Figure 2:
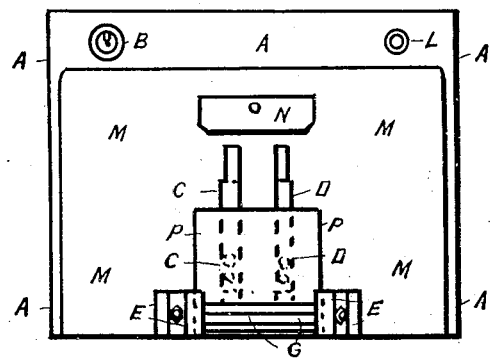
Figure 3:
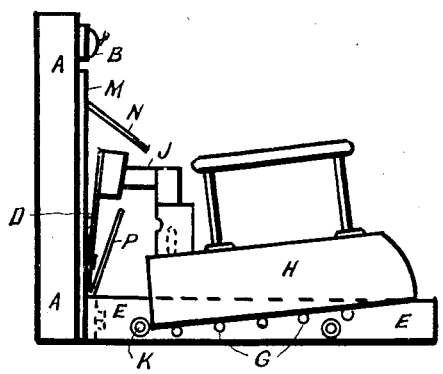

Figure 1, is a plan of the apparatus, and Fig. 2, is a front elevation. Fig. 3, is a side elevation, showing an iron in position, for heating, on the stand. In these drawings the same reference letters are used to mark the same or like parts wherever they are repeated.

As shown in the drawings the appliance for heating electric irons consists of a board A, provided with a switch B, and the necessary terminals and contacts C, and D. In connection with the board A, there is arranged a stand E, said stand being made of any suitable material, and provided with cross bars G, to reduce the contact surface when the iron is on the stand. The height of the bars G, is gradually reduced toward the board A, so that the iron H, when resting on these bars is inclined and its contacts J, press against the terminals C, and D, as shown in Fig. 3. The stand E, is also provided with a stop or bar K, to prevent the iron H, when in position on the stand, from impinging or bearing against the face of the board A.

The board A, is provided with a pilot lamp L, to indicate when the current is on, said lamp also serving as a reminder to the operator, when the iron is not in use, to turn or switch off the current.

The board A, is faced with a sheet of asbestos or like material M, and guards N, P, are provided in connection with the contacts.

The appliance has been described with reference only to a single iron, but it will be obvious that the appliance may be adapted to receive and heat any convenient number of irons.

In operation the action of the heating appliance is as follows:—The irons are placed on the stand so that their contacts press against the respective contacts on the board, the switch of which has been turned on. By using two irons, one iron can be in use while the other iron is heating. In this way the current is conserved, as immediately an iron is removed off the stand, that circuit is broken and the current is automatically turned off.

What I claim is:—

1. A device for heating electric irons, comprising a switchboard, an inclined stand to support the iron, and contacts on said board and on the iron.

2. A device for heating electric irons, comprising a switchboard, an inclined stand to support the iron, contacts on said board and on the iron, and a stop for preventing the iron bearing against the face of the switchboard.

In testimony whereof I have signed my name to this specification in the presence of two subscribing witnesses.

DAVID DONALDSON.

Witnesses:
 GEORGE PATTERSON,
 ALEXANDER G. SWANEY.